United States Patent [19]

Spargo et al.

[11] Patent Number: 4,572,518
[45] Date of Patent: Feb. 25, 1986

[54] LEAK FREE FLOATING PACKING SHAFT SEAL

[75] Inventors: John D. Spargo, Annapolis; A. Bayne Neild, Severna Park; Martha M. Phillips, Arnold, all of Md.

[73] Assignee: The United States of America as represented by the Secretary of the Navy, Washington, D.C.

[21] Appl. No.: 666,938

[22] Filed: Oct. 31, 1984

[51] Int. Cl.⁴ .............................................. F16J 15/28
[52] U.S. Cl. ......................................................... 277/75
[58] Field of Search .................. 277/3, 27, 70, 71, 72, 277/75

[56] References Cited

U.S. PATENT DOCUMENTS

| | | | |
|---|---|---|---|
| 2,809,854 | 10/1957 | McGahan | 277/72 |
| 3,044,786 | 7/1962 | Chillson | 277/70 |
| 3,047,299 | 7/1962 | Karsten | 277/75 |
| 3,109,661 | 11/1963 | Swaim et al. | 277/70 |
| 3,153,539 | 10/1964 | Flick | 277/70 |
| 3,164,420 | 1/1965 | Cramer | 277/70 |
| 3,471,157 | 10/1969 | Swearingen | 277/72 |
| 3,975,991 | 8/1976 | Nakajima | 277/75 |
| 4,257,617 | 3/1981 | Hill | 277/27 |
| 4,494,760 | 1/1985 | Spargo | 277/75 |

Primary Examiner—Robert I. Smith
Attorney, Agent, or Firm—Robert F. Beers; Ervin F. Johnston; Thomas Glenn Keough

[57] ABSTRACT

A leak free floating packing shaft seal is provided for a rotatable shaft and a supporting annular structure wherein the supporting annular structure has a high pressure upstream side and a low pressure downstream side. The floating seal includes an annular holder which is slidably mounted in the supporting structure for radial movement therein. A ring of packing material is mounted in a recess in the inner circumferential side of the holder. A first O-ring arrangement is mounted between the supporting structure and the upstream side of the holder for effecting a seal from the high pressure environment, and a second O-ring arrangement is mounted between the supporting structure and the downstream side of the holder. At least one passageway is provided for communicating the upstream and downstream size of the holder for balancing the pressures therebetween. With this arrangement the holder is free to undergo the radial movement without leakage and the detriment of lateral forces thereon.

11 Claims, 8 Drawing Figures

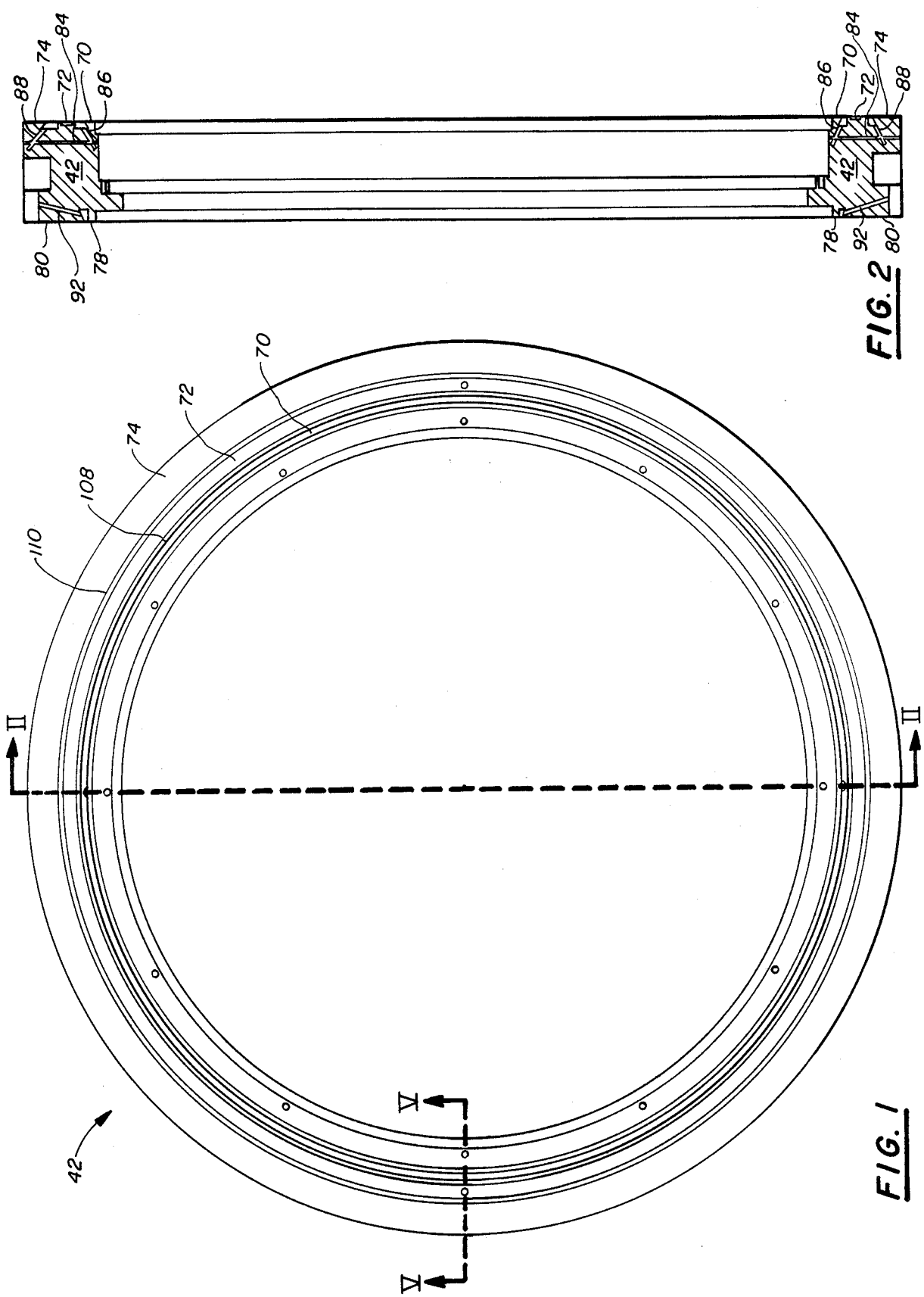

LEAK FREE FLOATING PACKING SHAFT SEAL

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to a leak free floating packing shaft seal which can be utilized for large propeller shafts, such as those used by submarines in a deep ocean environment.

Shaft packing was used on submarines until after World War II. After World War II the shaft packing was replaced with mechanical face seals because of the leakage problem of shaft packing at greater depths. The disadvantages of the mechanical face seals are that they are expensive and have to be replaced often due to wear and corrosion problems. Also, the mechanical face seals are heavy, costly, distort under pressure and require secondary O-ring seal support for the seal ring. The mechanical face seals also require very careful experienced mechanics to assemble the split configuration over the shaft and there is no assurance that the surface dimensions are acceptable after assembly.

The shaft packing type of seal has many advantages over the mechanical face seals except that prior art shaft packing seals have unacceptable leakage problems at great water depths attainable by modern submarines. Regardless of whether the seal is a shaft packing seal or a mechanical face seal, it must be capable of accomodating radial movements of the shaft due to vibration and eccentricity. It is important that the radial movements of the seal be substantially free of axial loading due to differential pressures between the high pressure environment on one side of the seal and the low pressure environment on the other side of the seal. One such floating packing seal is illustrated in U.S. Pat. No. 4,177,997 to Cartwright. In this patent the holder of the packing is pressure balanced on the upstream and downstream sides of the holder so that the holder is capable of radial movement without the detriment of axial forces thereon. Unfortunately the patented holder provides no way of sealing the holder within a supporting structure to prevent the high pressure outside environment from imposing itself on the internal spaces of the ship or boat utilizing such structure. Also the patent does not provide for preventing extrusion of the packing under high pressures. If the sealing and extrusion problems could be overcome the packing tpe of floating shaft seal would be preferable to the presently used mechanical face seals for submarines since the packing seal would be lower in cost, be lighter in weight, and would have wear elements which are easier to replace.

SUMMARY OF THE INVENTION

The present invention provides a leak free floating packing shaft seal wherein the packing holder is adapted for radial movement without leakage and free of lateral forces thereon. The floating seal is used between a rotatable shaft and a supporting annular structure wherein the supporting annular structure has a high pressure upstream side and a low pressure downstream side. The floating seal includes an annnular holder which is slidably mounted in the supporting structure for radial movement therein. A ring of packing material is mounted in a recess in the inner circumferential side of the holder. A first O-ring arrangement is mounted between the supporting structure and the upstream side of the holder for effecting a seal from the high pressure environment, and a second O-ring arrangement is mounted between the supporting structure and the downstream side of the holder. The holder is provided with a passageway for communicating the upstream and downstream sides of the holder so that the pressures therebetween are balanced. A series of such seals can be staged with pressure reducers so that operating depths can be increased.

OBJECTS OF THE INVENTION

An object of the present invention is to overcome the aforementioned problems associated with floating packing type of shaft seals.

A further object is to provide a substantially leak free floating packing shaft seal.

Another object is to provide a leak free floating packing shaft seal which is capable of operating efficiently at submarine depths greater than World War II submarine depths without the detriment of lateral forces on the packing holder.

Yet another object is to provide a leak free floating packing shaft seal which is low in cost, low in weight, and capable of easy replacement of worn seal components.

Still another object is to provide successive stages of leak free floating packing shaft seals wherein pressures between the seals are progressively reduced.

Still a further object is to provide a unique annular packing holder for a leak free floating packing shaft seal.

Other objects, advantages and novel features of the invention will become apparent from the following detailed description of the invention when considered in conjunction with the accompanying drawings.

DESCRIPTION OF THE DRAWINGS

FIG. 1 is a view of an upstream high pressure side of a packing holder of a leak free floating packing shaft seal.

FIG. 2 is a view taken along plane II—II of FIG. 1.

DESCRIPTION OF THE PREFERRED EMBODIMENT

Figure 6:
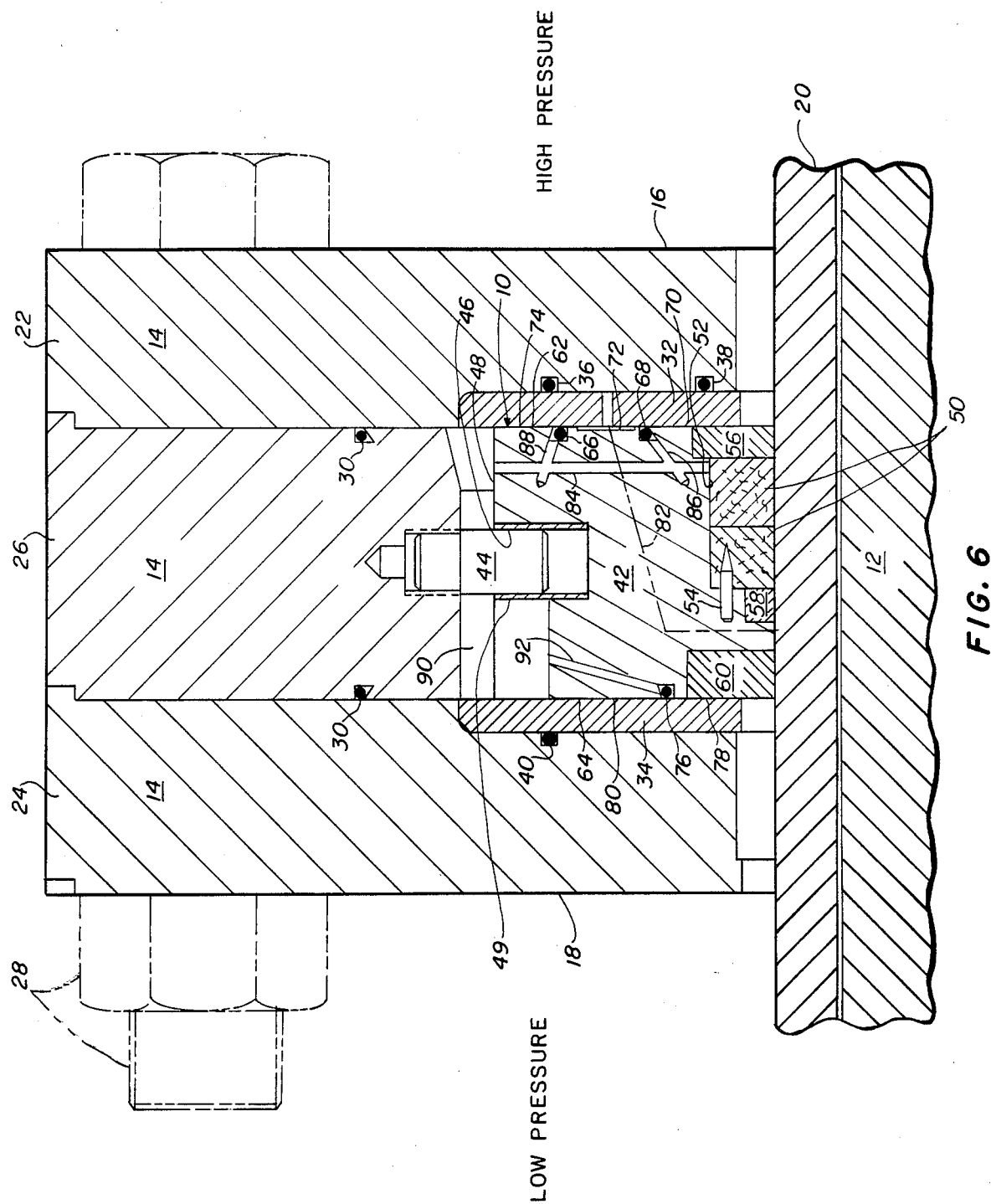
FIG. 6 is a cross-sectional view of a portion of a leak free floating packing shaft seal about a rotatable shaft.

Referring now to the drawings wherein like reference numerals designate like or similar parts throughout the several views there is illustrated in FIG. 6 a leak free floating packing shaft seal 10 for providing a seal between a rotatable shaft 12 and a support annular structure 14, the supporting structure having a high pressure upstream side 16 and a low pressure downstream side 18. The rotatable shaft 12 may be provided with a sleeve 20, and may be connected at its upstream end to a motor (not shown) for driving a propeller (not shown) connected at its downstream end. The floating seal to be described herein may be especially useful for sealing propeller shafts on a submarine. The supporting structure 14 may include upstream and downstream annular members 22 and 24 with an intermediate annular member 26 sandwiched therebetween. These members 22, 24, and 26 may be secured together by a bolt and nut combination 28 and may be sealed with respect to one another by O-rings 30. The upstream and downstream supporting structure members 22 and 24 may be provided with annular recesses for receiving annular bearings 32 and 34, respectively. The upstream bearing 32 may be sealed against the upstream structural member 22 by a pair of O-rings 36 and 38 and the downstream bearing 34 may be sealed against the downstream structural member 24 by an O-ring 40.

The floating seal 10 includes an annular holder 42 which is slidably mounted in the supporting structure 14 within the bearings 32 and 34 for radial movement therein in any direction within a plane normal to the longitudinal axis of the shaft 12. Means are mounted between the holder 42 and the supporting structure 14 for preventing continued rotation therebetween. This may be accomplished by providing a plurality of pin and oblong receptacle combinations 44 and 46 (one of such combinations being illustrated in FIG. 6) mounted to the supporting structure 14 and an outer annular side 48 of the holder. In the exemplary embodiment the pin 44 may be threaded within the inner annular side of the intermediate supporting structural member 26 and extend therefrom for movement within the oblong receptacle 46 within the outer annular side 48 of the holder 42. The oblong receptacle may be provided with an oblong bearing 49. Another pin and oblong receptacle combination (not shown) may be diametrically opposed from the one illustrated in FIG. 6, and preferably another set is located 90° from the first pair. With this arrangement the holder 42 is secured from rotation beyond the oblong receptacle, and yet the holder 42 has freedom for all radial movement in the direction of the pins as allowed by the flexibility of the material composing the holder 42.

A ring of packing material 50 is mounted in a recess 52 in the inner circumferential side of the holder 42. A suitable packing has been found to be braided Aramid fibers, two of such fibers being annularly wrapped around the shaft 12 to compose the packing 50, as illustrated in FIG. 6. Packing 50 may be retained and prevented from rotation relative to the holder 42 by spikes 54 (one of such spikes being illustrated in FIG. 6) extending into the holder 42 and into the packing 50. A pair of upstream and downstream annular bearings 56 and 58, respectively, may be recessed within the inner circumferential side of the holder 42 on the upstream and downstream sides respectively of the packing 50. It is extremely important that the downstream annular bearing 58 have a close tolerance to the shaft 12, in the order of 0.025 to 0.030 inches. This close tolerance will minimize extrusion of the packing 50 downstream along the shaft into the low pressure environment because of the differential in pressure between the upstream and downstream sides of the packing. Downstream from the bearing 58 may be another annular bearing 60 which is recessed within the inner circumferential side of the holder 42 for providing additional bearing surface about the shaft 12. In the preferred embodiment the bearings 56 and 60 may also be provided with a close tolerance to the shaft 12. In the preferred embodiment the holder 42 may be made of non-corrosive material, such as Inconel 625, and the bearings 56, 58, and 60 may be made of a non-metallic material such as Thordon. The bearing elements 56, 58, and 60 may be retained in place by being bonded to the retainer 42 with any suitable bonding material such as epoxy.

A feature of the present invention is to prevent a net longitudinal force on the holder 42 which would cause resistance to radial movements of the holder 42 within the supporting structure 14. The present invention accomplishes this result and still maintains an effective seal between the high pressure and low pressure sides of the support structure 14 of the shaft 12. This may be accomplished by first O-ring means mounted between the support structure 14 and the upstream side 62 of the holder 42, and second O-ring means mounted between the support structure 14 and the downstream side 64 of the holder 42. The first O-ring means may include the upstream side of the holder containing a pair of O-rings 66 and 68 so as to divide the upstream side of the holder into inner, middle, and outer annular areas 70, 72, and 74, respectively. The second O-ring means may include the downstream side 64 of the holder having an O-ring 76 so that the downstream side has inner and outer annular areas 78 and 80, respectively.

Still in connection with the desired result of this invention to eliminate a net longitudinal force on the holder 42 and yet maintain an effective seal, means communicating with the upstream and downstream holder sides 62 and 64 are provided for balancing the pressures therebetween. The balancing means may include passageways which join specific areas of the upstream and downstream sides 62 and 64 of the holder. In the exemplary embodiment of FIG. 6 the balancing means may include the holder 42 having a passageway 82 (shown in phantom in FIG. 6 to indicate it is not in the plane of FIG. 6 and in full in FIG. 5) which communicates the middle area 72 of the holder's upstream side with the inner area 78 of the holder's downstream side. This may be accomplished by terminating the low pressure end of the passageway at the sleeve 20 between the bearings 58 and 60 since this pressure will be seen on the downstream side of the bearing 60 and radially outward along the holder to the O-ring 76. The O-rings 66, 68 and 76 should be placed such that the middle area 72 of the holder's upstream side is the same in size as the inner area 78 of the holder's downstream end 64. The area of the inner area 78 of the holder's downstream end extends from the O-ring 76 inwardly to the sleeve 20. This means that the low pressure forces on the upstream and downstream sides 62 and 64 of the holder are balanced by the passageway 82 within the holder. Pressure balancing of the holder 42 is further achieved by the holder having passageways for communicating the inner and outer areas 70 and 74 of the holder's upstream side with the outer area 80 of the holder's downstream side. These passageways may include radially extending passageway 84 and interconnecting inner and outer passageways 86 and 88 which communicate with the inner and outer areas 70 and 74 of the holder within O-ring grooves at the bottom of O-ring 68 and at the top of O-ring 66, respectively. The passageway 84 picks up high pressure from two sources, namely at its inner end where the packing 50 is located and through passageway 86 where the high pressure environment is seen at the inner area 70 between the bearings 56 and 32. The outer end of the passageway 84 extends into an annular space 90 between the outer circumferential side 48 of the holder 42 and the inner circumferential side of the intermediate supporting structural component 26. The high pressure within annular space 80 can be picked up by a passageway 92 within the holder which extends from the outer circumferential side 48 of the holder to the top of an O-ring groove for the O-ring 76. The passageway 92 then communicates the inner and outer areas 70 and 74 of the holder's upstream side 62 with the outer area 80 of the holder's downstream side 64. The inner and outer areas 70 and 74 of the holder's upstream side are equal in size to the outer area 80 of the holder's downstream sides so that the high pressure exerted on these sides is balanced. The outer area 80 of the holder's downstream side extends from the O-ring 76 outwardly to the inner circumferential side 48 of the holder. With this arrangement the holder 42 is free for radial movement within the structural support 14 without leakage and free of any net longitudinal force thereon.

Figure 7:
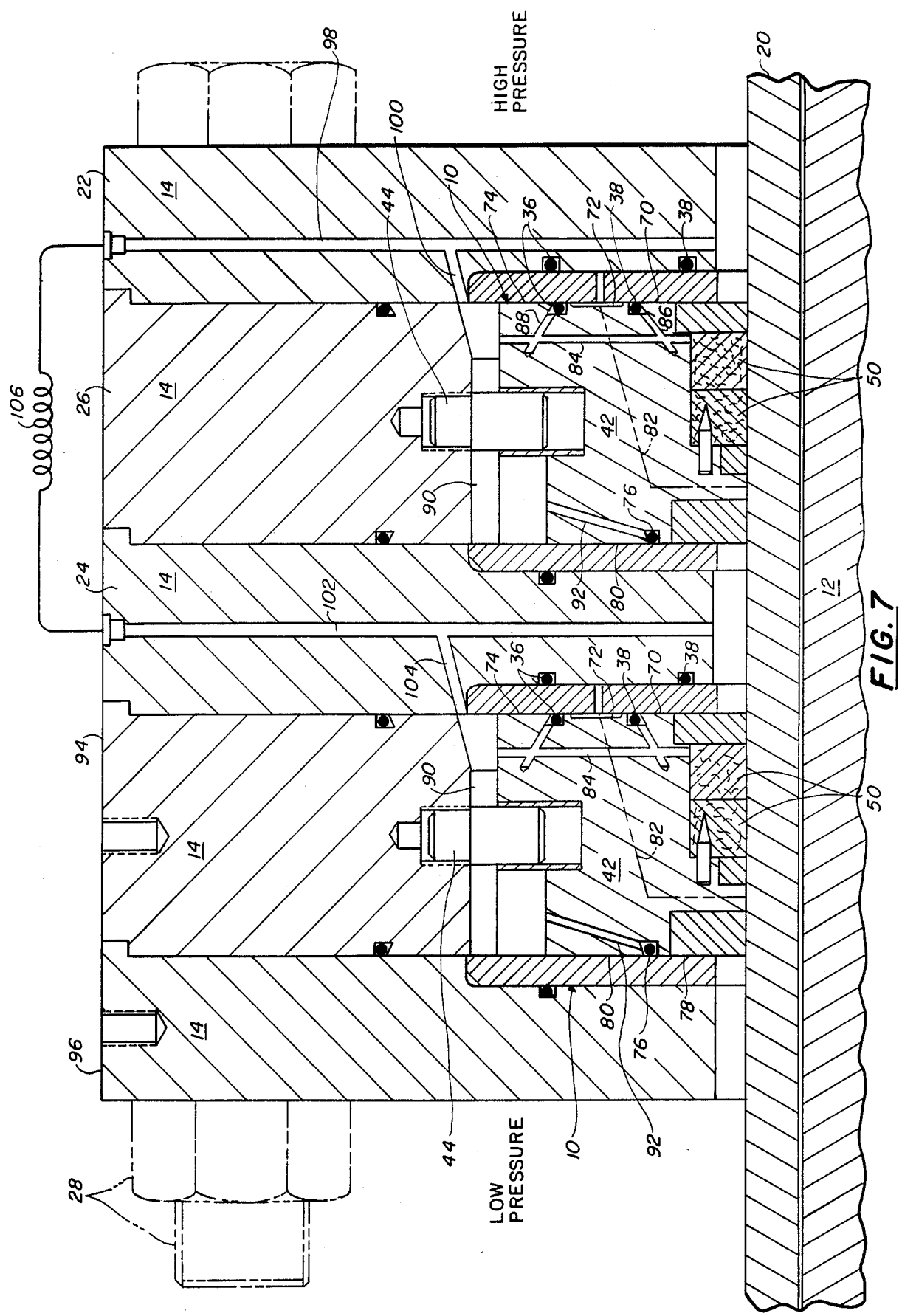
FIG. 7 is successive stages of leak free floating packing shaft seals with provision for reducing pressures therebetween by a predetermined amount, said stages being about a rotatable shaft.

As illustrated in FIG. 7, the floating packing shaft seals 10 may be staged in any desired number, two of such seals, an upstream and a downstream seal, being shown in FIG. 7 for exemplary purposes. The supporting structure 14 may be provided with additional annular components 94 and 96 which are secured with the other annular components by the bolt and nut combination 28 shown in phantom because they are offset from the plane of FIG. 7. In the staged embodiment the upstream structural component 22 is provided with a passageway 98 which radially extends between the structural component's inner and outer circumferential ends. This may be referred to as a high pressure passageway since the bottom end thereof is in communication with the high pressure ambient environment. If desired, a passageway 100 may communicate the passageway 98 with the annular space 90 between the holder 42 and the supporting structure 26. This will provide a positive high pressure application to the passageway 84 within the holder. Further, the component 24 of the supporting structure is provided with a passageway 102 which is similar to the passageway 98 in that it extends radially between the inner and outer circumferential sides of the component 24. If desired a passageway 104 may communicate the passageway 102 with the downstream annular area 90, thus applying a positive communication to the downstream holder passageway 84. An important feature of the present invention is the interconnection of the passageways 98 and 102 with a pressure reducer 106. This pressure reducer may be interconnected at the outer ends of the passageways 98 and 102, and may be a tube which has a predetermined sized constriction for reducing the pressure. This, in essence, makes the passageway 102 a low pressure passageway as contrasted to the passageway 98. The degree of pressure reduction depends upon the number of seals 10 staged in this embodiment. The more seals that are staged the less the pressure drop will be designed into the pressure reducers 106 between the stages. It should be noted that while a lower pressure is applied through passageway 102 to the inner and outer annular areas 70 and 74 of the downstream holder 42, this pressure is a high pressure as contrasted to the lower pressure seen at areas 72 and 78 of the downstream holder as implemented by the passageway 82. If an additional downstream seal 10 was added to the exemplary embodiment in FIG. 7 it should be understood that another pressure reducer 106 would be utilized between the passageway 102 and a subsequent downstream passageway in the supporting structure for application to the additional seal.

Figure 8:
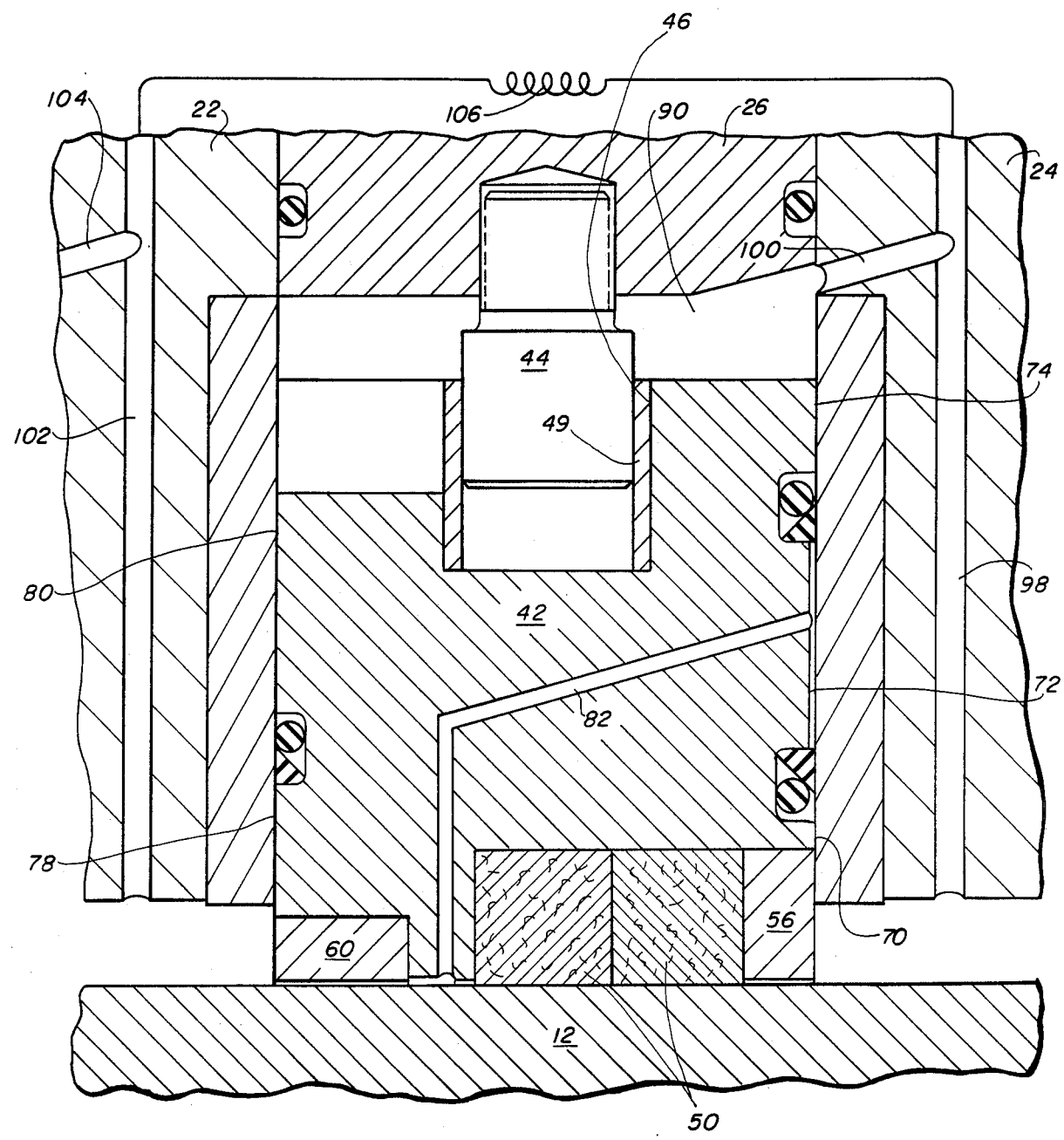
FIG. 8 is a cross-sectional view similar to FIG. 6 except showing a slightly different embodiment in the passageways for balancing pressures across the packing holder, said seal being about a rotating shaft.

The passageways 84, 86, 88, and 92 of the FIG. 7 embodiment could be omitted as illustrated in FIG. 8. The passageway 98 will apply high pressure via passageway 100 to the outer annular area 74 of the holder and via annular area 90 to the outer annular area 80 of the holder. High pressure is already applied to the inner annular area 70 of the holder from the high pressure environment. With the passageway 82 for balancing the low pressures, the holder 42 will be completely pressure balanced by this arrangement. If this embodiment was to be a single floating seal instead of a series of seals staged, then passageways 98 and 102 would be closed at their tops and pressure reducer 106 and passageway 104 would be eliminated.

Figures 3, 4:
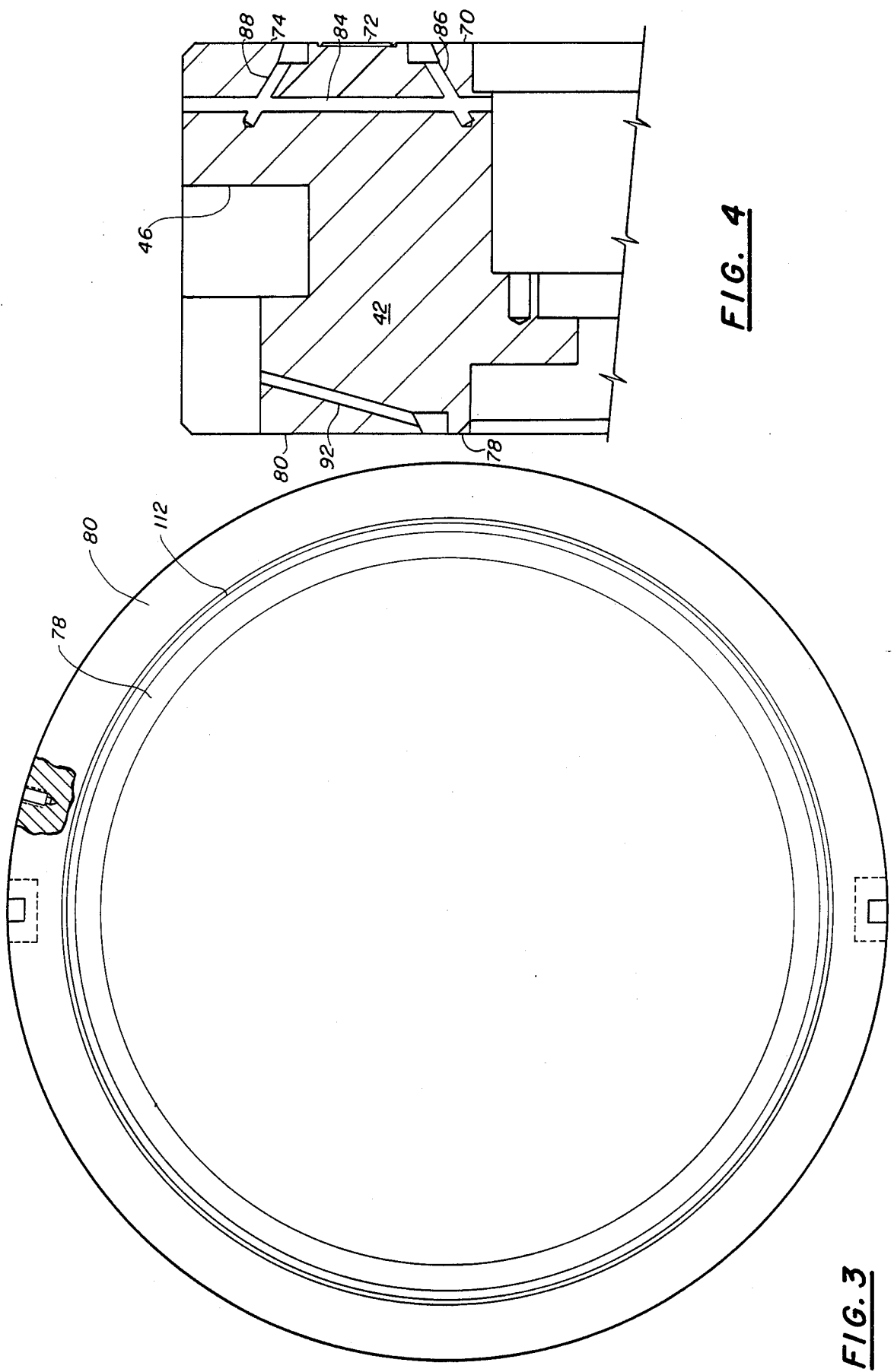
FIG. 3 is a downstream low pressure side of a packing holder of a leak free floating packing shaft seal.
FIG. 4 is an enlarged detail of the top cross-sectional portion of FIG. 2.
Figure 5:
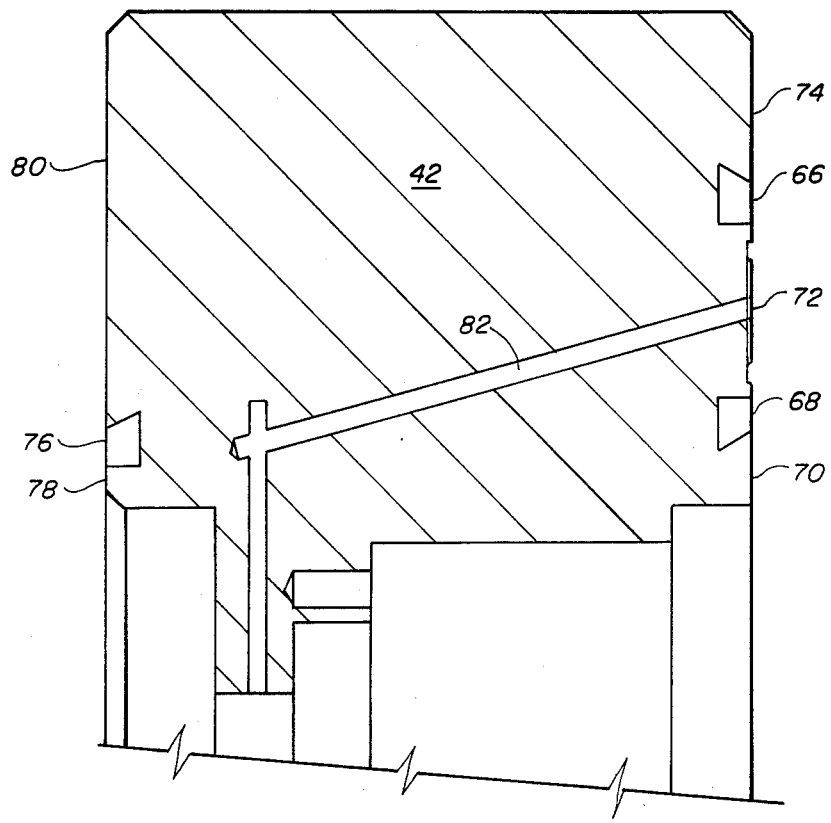
FIG. 5 is a cross-sectional view taken along V—V of FIG. 1.

The invention also includes the holder 42 per se as an article of manufacture. The details of this holder are illustrated in FIGS. 1-5. The holder is an annular body, the upstream side of which is illustrated in FIG. 1. This upstream side has a pair of O-ring grooves 108 and 110. The downstream side of the holder is illustrated in FIG. 3. This downstream side has an O-ring groove 112. The O-ring grooves 108 and 110 on the upstream side of the holder divide the upstream side of the holder into the inner, middle and outer annular areas 70, 72 and 74. The O-ring groove 112 divides the downstream side of the holder 42 into the inner and outer annular areas 78 and 80. FIGS. 2 and 4 illustrate the high pressure passageways 84, 86, 88 and 92, and FIG. 5 illustrates the low pressure passageway 82. It is important that the annular areas 72 and 78 be equal in size and that the annular areas 70 and 74 be equal to the annular area 80. In this manner the low pressures are balanced on opposite sides of the holder 42 and the high pressure is balanced on opposite sides of the holder 42.

Obviously many modifications and variations of the present invention are possible in the light of the above teachings. It is therefore to be understood that within the scope of the appended claims the invention may be practiced otherwise than as specifically described.

We claim:

1. A leak free floating packing shaft seal for use between a rotatable shaft and a supporting annular structure, the supporting structure having a high pressure upstream side and a low pressure downstream side, the floating seal comprising:

an annular holder slidably mounted in the supporting structure for radial movement therein;

a ring of packing material mounted in a recess in the inner circumferential side of the holder;

first O-ring means mounted between the supporting structure and the upstream side of the holder for effecting a seal from the high pressure environment;

second O-ring means mounted between the supporting structure and the downstream side of the holder; and means communicating with the upstream and downstream sides of the holder for balancing the pressures therebetween;

whereby the holder is free for said radial movement without leakage and the detriment of lateral forces thereon.

2. A floating seal as claimed in claim 1 wherein the pressure balancing means includes:
the holder having at least one passageway.

3. A floating seal as claimed in claim 1 wherein:
the first O-ring means includes the upstream side of the holder having a pair of O-rings so that the upstream side has inner, middle, and outer annular areas; and
the second O-ring means includes the downstream side of the holder having one O-ring so that the downstream side has inner and outer annular areas.

4. A floating seal as claimed in claim 3 wherein the pressure balancing means includes:
the holder having a passageway interconnecting the middle area of the holder's upstream side with inner area of the holder's downstream side; and
the latter two areas being equal in size.

5. A floating seal as claimed in claim 4 wherein the pressure balancing means includes:
the holder having passageways for communicating the inner and outer areas of the holder's upstream side with the outer area of the holder's downstreamm side.

6. A floating seal as claimed in claim 1 including:
means mounted between the holder and the supporting structure for preventing rotation therebetween.

7. A floating seal as claimed in claim 6 wherein the guiding means includes:
a plurality of pin and receptacle combinations mounted to the supporting structure and an outer annular side of the holder.

8. A floating seal as claimed in claim 1 including:
a pair of annular bearings recessed within the inner side of the holder and disposed about the shaft; and
one of the bearings contiguous with the ustream side of the holder, being adjacent to the packing, and having a close tolerance to the shaft of approximately 0.030 inches so that the packing will not be extruded due to the high pressure environment.

9. A leak free floating seal apparatus for use between a rotatable shaft and a supporting annular structure, the supporting structure having a high pressure upstream side and a low pressure downstream side, the apparatus comprising:
a pair of annular holders slidably mounted in a spaced relationship in the supporting structure for radial movement therein;
a ring of packing material mounted in a recess in the inner circumferential side of each respective holder;
first O-ring means mounted between the supporting structure and the upstream side of each respective holder for effecting a seal from the high pressure environment;
second O-ring means mounted between the supporting structure and the downstream side of each respective holder;
means communicating with the upstream and downstream sides of each holder for balancing the pressures therebetween so that each holder is free for said radial movement without the detriment of lateral forces thereon;
passageway means in the holder for communicating the high pressure of said environment to the upstream side of the packing of each holder; and
pressure reducing means in said passageway means for reducing the pressure between successive stages of the holders so that each holder, except the most upstream holder, receives a reduced pressure at its respective packing over the pressure at the packing of the previous upstream holder therefrom.

10. A holder for a leak free floating seal comprising:
an annular body having an upstream side and a downstream side;
the upstream side of the body having a pair of O-ring grooves dividing the upstream side into inner, middle and outer annular areas;
the downstream side of the body having an O-ring groove dividing the downstream side into inner and outer annular areas;
the annular body having a passageway communicating one of the upstream side areas with one of the downstream side areas; and
the latter two areas being equal.

11. A holder as claimed in claim 10 including:
the two areas in communication via said passageway being the middle area of the upstream side and the inner area of the downstream side.

* * * * *